United States Patent
Heiland et al.

(10) Patent No.: US 7,489,987 B2
(45) Date of Patent: Feb. 10, 2009

(54) CONTROL OF AN ACTIVE VIBRATION ISOLATION SYSTEM

(75) Inventors: Peter Heiland, Raunheim (DE); Peter A. Kropp, Mainz (DE)

(73) Assignee: Integrated Dynamics Engineering GmbH, Raunheim (DE)

( * ) Notice: Subject to any disclaimer, the term of this patent is extended or adjusted under 35 U.S.C. 154(b) by 263 days.

(21) Appl. No.: 11/462,134

(22) Filed: Aug. 3, 2006

(65) Prior Publication Data

US 2007/0043479 A1 Feb. 22, 2007

(30) Foreign Application Priority Data

Aug. 5, 2005 (EP) .................................. 05017138

(51) Int. Cl.
*G05B 13/00* (2006.01)
(52) U.S. Cl. .................... 700/280; 702/56; 702/196
(58) Field of Classification Search ................ 700/275, 700/280; 702/54, 56, 191–195; 73/570
See application file for complete search history.

(56) References Cited

U.S. PATENT DOCUMENTS

| | | | |
|---|---|---|---|
| 4,999,534 A | 3/1991 | Andrianos | |
| 5,638,304 A | 6/1997 | Billoud | |
| 6,351,714 B1* | 2/2002 | Birchmeier | 702/56 |
| 6,477,472 B2* | 11/2002 | Qian et al. | 702/54 |
| 6,721,673 B2* | 4/2004 | Rao | 702/76 |
| 6,925,879 B2* | 8/2005 | Raichle | 73/579 |
| 6,950,760 B2* | 9/2005 | Henry et al. | 702/54 |
| 7,167,814 B2* | 1/2007 | Lindberg et al. | 73/660 |
| 2001/0035068 A1 | 11/2001 | Case et al. | |

FOREIGN PATENT DOCUMENTS

EP 1197824 4/2002

OTHER PUBLICATIONS

Barbara Tuck, Choosing FPGAs, ASICs, or cores for DSP-based system design, 8167 Computer Design, Feb. 1996, No. 2, pp. 85, 86, 88, 92, 94, 96, 98, Tulsa, OK, US.
Yongqing Fu and W. Kinsner, A Marine Torsion Vibration Measuring Method and its Implementation based on FPGA, Proceeding of the 2002 IEEE Canadian Conference on Electrical & Computer Engineering, 2002, pp. 488-493, IEEE.
Christoph Ditzen and Jeff Haight, A Parameterizable BiQuad block for IIR filters in ASICS, Implementations & Motivations, VLSI Technology, Inc., 1990, IEEE.
Lingfeng Yuan et al., Distributed arithmetic implementation of multivariable controllers for smart structural systems, Department of electrical and computer engineering and intelligent systems center, Jan. 26, 2000, IOP Publishing Ltd., USA.

* cited by examiner

*Primary Examiner*—Albert DeCady
*Assistant Examiner*—Charles R Kasenge
(74) *Attorney, Agent, or Firm*—DeMont & Breyer, LLC

(57) ABSTRACT

Control of an active vibration isolation system with a digital controller, which includes an FPGA system (5) as the control unit. The FPGA system (5) is made up of freely programmable gate arrays with a sensor control matrix (51), which calculates axis signals in required degrees of freedom, with a control cascade block (53) for the axis signals containing several biquad filters (531, 532, 533, 534, 535), and with an output signal calculation block (55) for calculating digital actuator actuation signals. A digital signal processor (9) is connected in parallel with the FPGA system (5) in order to calculate controls with low phase loss requirements.

10 Claims, 3 Drawing Sheets

CONTROL OF AN ACTIVE VIBRATION ISOLATION SYSTEM

Figure 1:
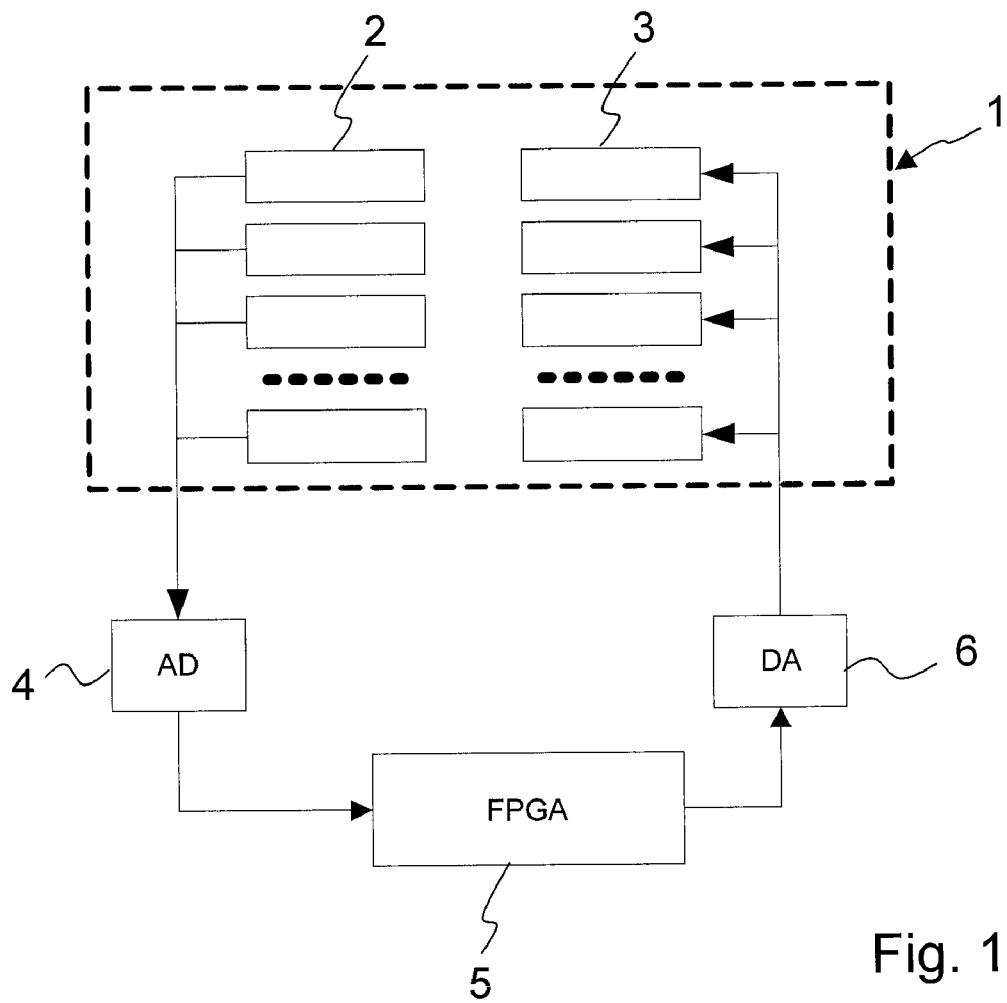

The invention relates to the control of an active vibration isolation system incorporating a number of vibration signal transducers for providing analog sensor signals, a number of actuators for suppressing vibration and a control unit for processing the sensor signals to form actuator actuation signals.

Control systems of this kind are designed in the form of a control loop (EP-A 0 621 418, U.S. Pat. No. 5,423,523, U.S. Pat. No. 5,734,246), wherein the control unit works either at the analog or at the digital level. The advantage of processing signals at the analog level is the faster achievable response time to disturbances which act on the vibration isolation system, namely compared with signal processing in a digital control unit. On the one hand, this is due to the double conversion from analog to digital and digital to analog, and, on the other, to the sampling rate and the computation time within the sampling rate, which leads to an additional signal run time. The sampling rate can only be increased to the extent that all control algorithms can be processed within one sampling period. In practice, therefore, the complexity of the control algorithm together with the computational power of the digital signal processor (DSP) determines the maximum possible sampling rate and thus the shortest possible signal run time. Compared with analog control units, a digital control unit in turn has significant advantages with regard to good configuration capability, possibilities for control by means of a PC, and the possibility of adaptation to suit changing system conditions.

The invention is therefore based on the problem of providing control for an active vibration isolation system using a control unit, which works at the digital level, but with which the additional signal run time remains moderate.

The stated problem is solved based on the teaching of claim 1 and is embodied and improved in the measures characterized in dependent claims.

In detail, an FPGA system made up of field programmable gate arrays is used as the control unit, upstream of which an analog-digital converter is connected and downstream of which a digital-analog converter is connected (the FPGA system constitutes a subsystem of the overall system). On the input side, the FPGA system has a sensor control matrix, which forms axis signals, associated with the six degrees of freedom, from the sensor signals. The axis signals are each processed in control cascades in order to provide axis output signals. Actuator actuation signals are obtained from the axis output signals in an output control calculation circuit. The actuator actuation signals, which are initially digital, are converted to analog actuator actuation signals by means of a digital-analog converter on the output side.

To optimize the operation of the FPGA subsystem, it is expedient to connect a sensor buffer upstream of the FPGA system on the input side and an actuator buffer downstream of the FPGA system on the output side. In this way, high sampling rates of the FPGA system can be used independently of clock rates of upstream or downstream stages of the control system. In this connection, it can be advantageous to insert an input-side FPGA module between the digital-analog converter and the sensor buffer, and an output-side FPGA module between the actuator buffer and the digital-analog converter.

In general, there are six degrees of freedom to be taken into account, i.e. there are six axis signals to calculate, and, for this purpose, the sensor control matrix multiplies six sensor values by a 6×6 matrix. The axis signals so produced must generally also be further processed by filtering to produce actuation signals at the actuator. Therefore, six independent control cascades are provided for the six axis signals. The control cascades preferably each contain five biquad filters in each row. This enables high-pass or low-pass or other filter characteristics to be realized.

In particular, a digital signal processor DSP, the like of which is already used in known control systems for active vibration isolation systems, is considered as such an alternative control device. These digital signal processors DSP cannot be operated at the high sampling rate of the FPGA system.

The DSP control device is expediently connected both to the sensor buffer and to the actuator buffer in order to be able to access the control system. The sampling rate of the DSP control device will be less than the clock rate encountered with the FPGA system. This opens up the possibility of allowing controls with a stringent requirement for the lowest possible phase loss to run on the FPGA system, but of allowing other controls to be calculated on the DSP control device. Because of the connection to the actuator buffer, signal summation can be carried out in this actuator buffer, while at the same time it does not matter how quickly the data arrive from the DSP control device. In particular, the control path of the FPGA subsystem is not adversely affected by the additional data of the DSP control device.

The digital signal processor DSP or a further digital signal processor DSP of this kind can also be connected to at least one of the biquad filters in order to be able to change its coefficients, if necessary. In this way, the vibration isolation system can be quickly adapted to suit changing basic conditions.

Each control cascade can have a plurality of biquad filters, it being expedient to assign an output buffer to each biquad filter, which output buffer can be used by a subsequent biquad filter. At the same time, a further signal processor DSP can also be connected for diagnostic purposes.

In the case where the digital signal processor is connected to the actuator buffer, it is also able to control additional digital actuator actuation signals. In this connection, it is possible to provide more than six digital actuator actuation signals in the actuator buffer if this is expedient or necessary for the control of the active vibration isolation system.

Figure 2:
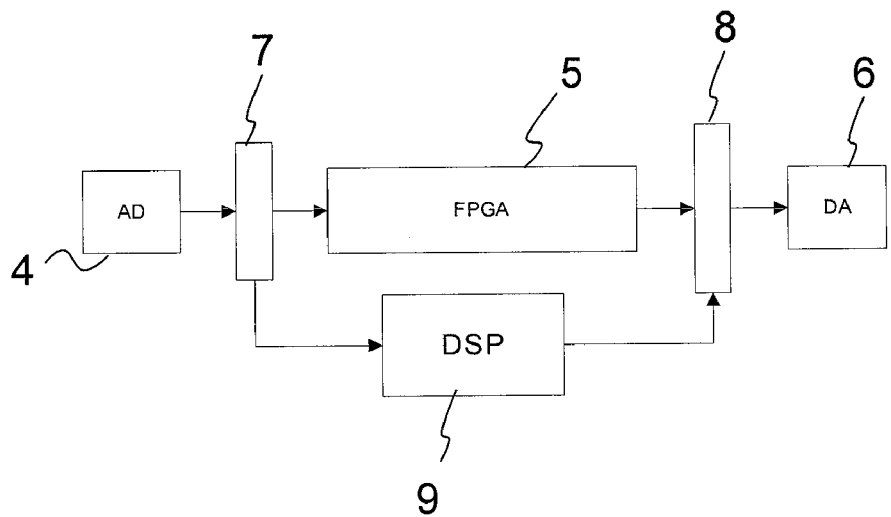
Figure 3:
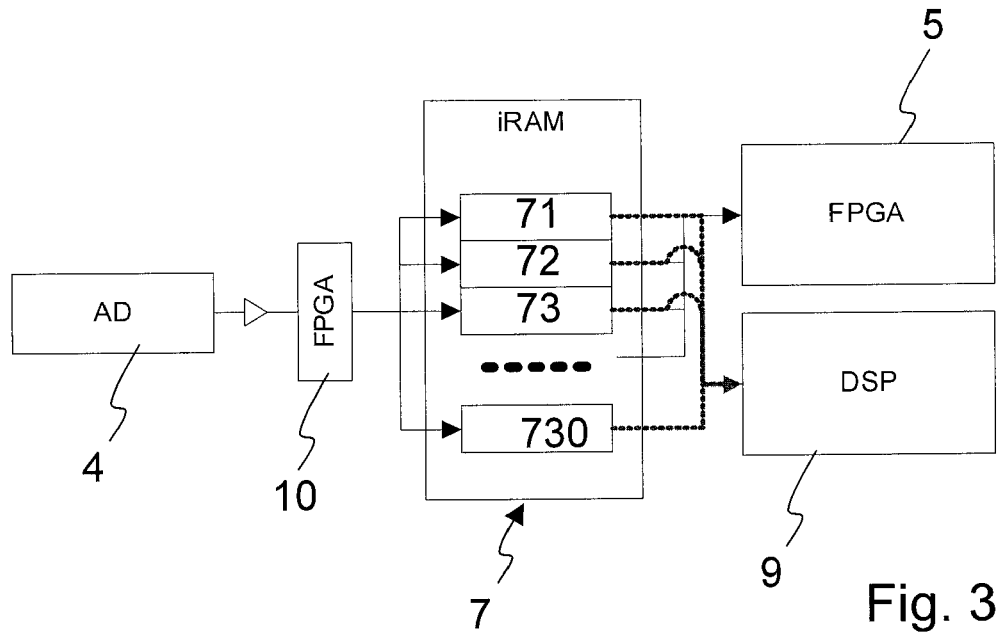
Figure 4:
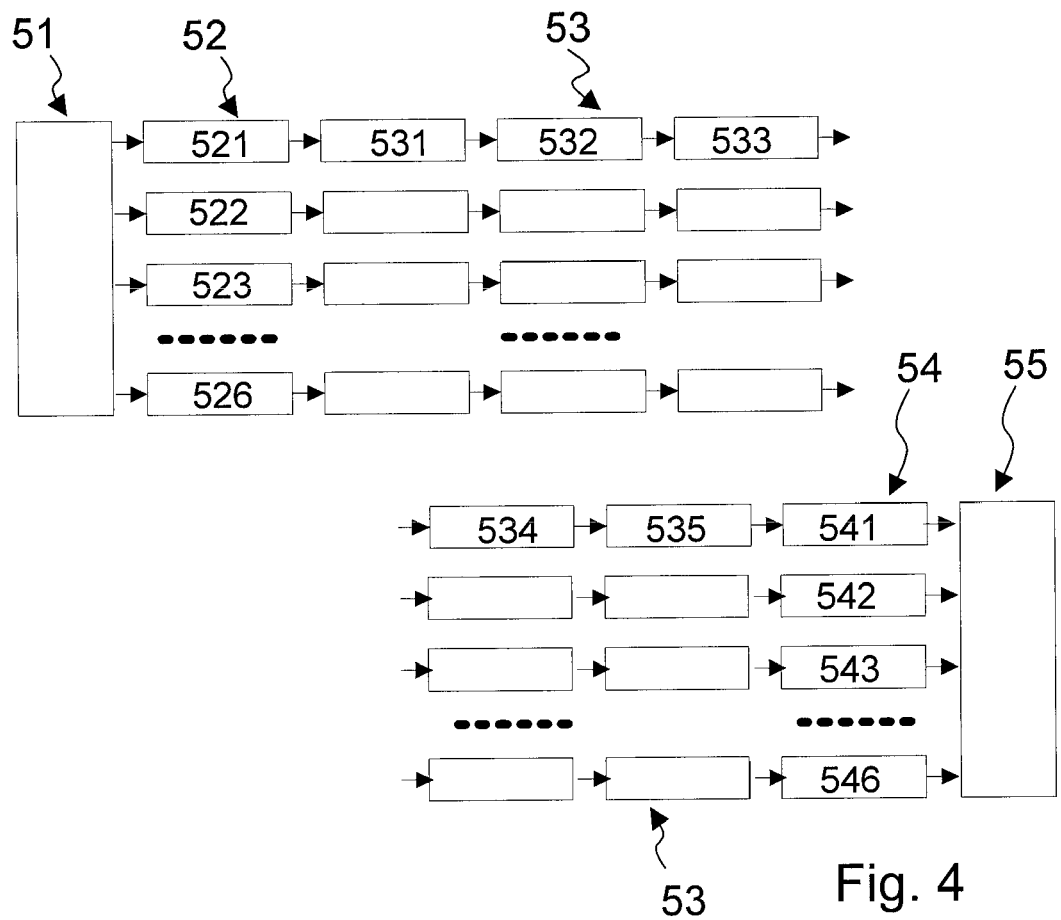
Figure 5:
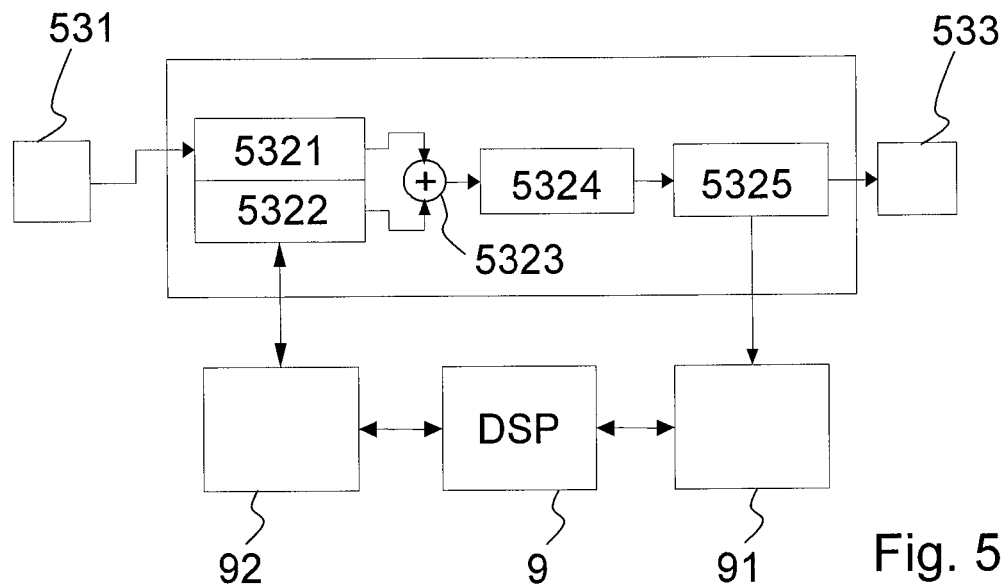
Figure 6:
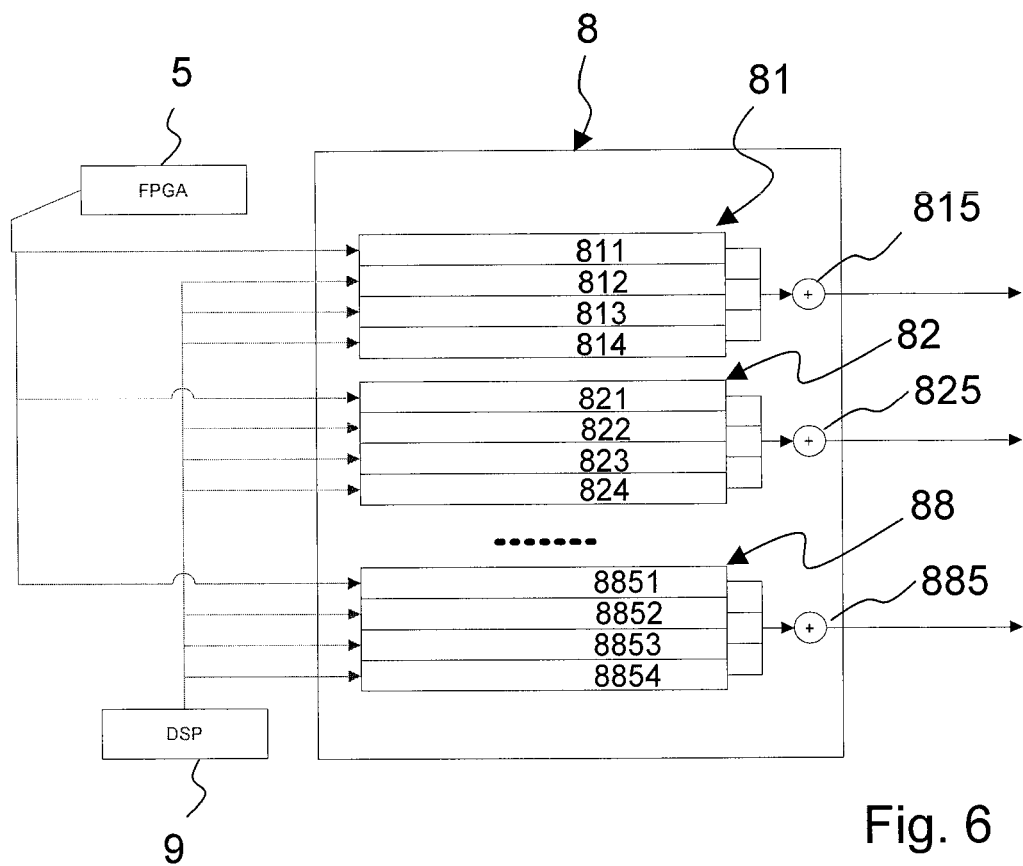

Exemplary embodiments of the invention are described with reference to the drawing, in which:

FIG. 1 shows a basic form of the control of an active vibration isolation system, FIG. 2 shows an expanded embodiment of the control of the active vibration isolation system, FIG. 3 shows a detail of the schematic circuit in FIG. 2, FIG. 4 shows a schematic representation of a control cascade as part of the circuit shown in FIG. 1 or 2, FIG. 5 shows a detail of a possible additional circuit for FIG. 4, and FIG. 6 shows an embodiment of part of the circuit from FIG. 2.

FIG. 1 represents the basic schematic of the control of an active vibration isolation system 1. This vibration isolation system supports a mass to be isolated with respect to a platform and includes a set of passive isolation elements (spring/damper combinations made of rubber, air springs, steel springs and the like) and of active elements, which, for example, are controlled in antiphase to the vibration excitation of the mass in order to isolate the mass against ground vibration, for example. Active vibration isolation systems of this kind are known and are therefore not described in any more detail here. In detail, these active vibration isolation systems contain a number of vibration signal transducers or sensors 2 for providing analog sensor signals and a number of actuators 3 for suppressing vibration of the mass. The vibration signal transducers or sensors 2 are arranged around the mass to be isolated in a particular manner suitable for the application, including with regard to their directional sensitivity. The actuators 3 are likewise arranged in a suitable manner with respect to the mass in order to support it and to isolate the vibration of the mass from the surroundings or to counteract such vibration.

The sensors 2 and the actuators 3 are connected via a controller, which includes an FPGA subsystem 5 comprising freely programmable gate arrays as a control unit. The FPGA subsystem works purely digitally, on account of which an analog-digital converter 4 for converting the analog sensor signals to digital sensor signals is connected on its input side, and a digital-analog converter for converting the digital actuator actuation signals to analog actuator actuation signals is connected on its output side. The components 2, 4, 5, 6, 3 thus form a controller feedback loop.

FPGAs are programmable memory modules which have a matrix of calculation elements, and their functionality is determined by configuration bits. These calculation elements, also referred to as logic blocks, are linked by a large number of wiring channels. In addition, all internal resources of programmable I/O blocks are encompassed. This enables specific circuits to be implemented in FPGAs, the logic functions of which are reproduced in the logic blocks, and the linked results of which realize the entire circuit.

FIG. 2 shows an expansion of the schematic in FIG. 1, omitting the sensors 2 and the actuators 3. A sensor buffer 7 is connected between the analog-digital converter 4 and the input to the FPGA subsystem, and an actuator buffer 8 is connected between the output of the FPGA subsystem and the digital-analog converter 6. A digital signal processor DSP 9 is arranged in parallel with the FPGA subsystem.

Digital signal processors are microprocessors, which are tailored to suit digital signal processing requirements. The code for DSPs includes many arithmetic operations, in particular multiplications and additions. There are few branches, but when they do occur they have jump destinations which can be predicted very easily. DSPs have capability for parallel processing, that is to say they process very large quantities of data. The programming language C has also become standard for DSPs, but time-critical sub-programs must be programmed in assembler. As, in most signal-processing systems, complex mathematical operations are used on time-critical signals (real-time), DSPs have modified architectures in order to accelerate repetitive, numerically involved calculations.

In this arrangement of the systems shown in FIG. 2, the FPGA subsystem is used for forming the vibration isolation control signals, while other control systems are handled by the DSP system. This DSP system can access the control system data by means of the sensor buffer 7 and the actuator buffer 8, but is not dependent on the clock rate of the FPGA subsystem for the choice of sampling rate. Controls with a stringent requirement for the lowest possible phase loss (control delay) are calculated on the FPGA subsystem, while other controls, for example such as are used after moving the mass that is to be isolated of the vibration isolation system from one position to another position on a machine bed or the like, are calculated by the DSP system. The values calculated by the two systems are summed at the actuator buffer 8.

FIG. 3 shows the structure of the sensor buffer 7. A RAM memory is used with areas 71, 72, 73, 730 for individual sensors. An FPGA module 10 is expediently used for controlling these areas. Access to the individual sensor memory areas 71, 72, 73, 730 can be made both by the FPGA subsystem 5 and the DSP system 9. As already explained, this takes place independently from one another and even at different sampling rates.

FIG. 4 shows the internal structure of the FPGA subsystem. A sensor control matrix 51, a memory area 52 for axis signals 521, 522, 523, 524, 525 and 526, a control cascade block 53, a memory area 54 for axis output signals 541, 542, 543, 544, 545 and 546, and an output signal calculation block 55 are provided. The sensor control matrix 51 takes the individual sensor signals from the associated memory areas of the sensor buffer 7 and multiplies them by a 6×6 matrix in order to arrive at the axis signals 521 to 526 for the six degrees of freedom (i=1 . . . 6).

Axis signal $$[i] = \sum_{k=1}^{6} \text{Sensor signal } [i][k] \cdot \text{Sensor } [k] \tag{1}$$

The axis signals are processed in the control cascade block 53 to form axis output signals, namely a control cascade is provided for each axis signal 521 to 526, each control cascade having five biquad filters 531, 532, 533, 534 and 535, which are connected in series and which represent second-order IIR filters. A fixed calculation rule with coefficients, which can be freely set up by means of an FPGA memory (not shown), is implemented in each biquad. The result of the first biquad 531 in the row is fed to the next biquad 532 as an input signal. There are six independent control cascades.

The biquad ("bi-quadratic") is a two-pole, two-zero filter and consists of five coefficients. There are several implementations for this filter. The embodiment presented here is the so-called Direct Form I representation.

The transfer function of a biquad is given by the following formula:

Transfer function of a biquad filter $$H(z) = \frac{b_0 + b_1 z^{-1} + b_2 z^{-2}}{1 + a_1 z^{-1} + a_2 z^{-2}} \tag{2}$$

This can be implemented as a sum formula in software as follows (y is the output sample, x is the input sample):

$$y(n) = a_1 y(n-1) + a_2 y(n-2) + b_0 x(n) + b_1 x(n-1) + b_2 x(n-2) \tag{3}$$

This sum formula can be rewritten as follows, where the biquad calculation is based on input sample x[ ], accumulated results d[ ] and coefficients b and a.

$$d[n] = x - a_1 d[n-1] - a_2 d[n-2]$$

$$y = b_2 d[n-2] + b_1 d[n-1] + b_0 d[n] \tag{4}$$

The current input sample x together with the accumulated results d[ ] and the coefficients a and b are used to calculate the output sample y.

An array with three values d[ ] must be maintained for each biquad, together with the coefficients of the filter a, b. In addition, the output sample y must be maintained, as it constitutes the input for the next biquad in a row.

FIG. 5 shows a schematic overview of a biquad 532 and access to the data by a DSP system 9. Such a biquad is connected to a preliminary calculation unit, which is shown here as the biquad 531. On the output side, a subsequent calculation unit, in this case the biquad 533, is connected to the biquad 532. On the input side, the biquad 532 includes an input sample stage 5321 for input samples x, and an excitation sample stage 5322 for excitation signals n. The stage 5322 forms a summation input and constitutes an additional input bin for the respective biquad, and enables diagnostic signals, e.g. noise or sinusoidal signals, to be fed into the biquad. The input sample x for each biquad is therefore made up of the applied input sample and an optional additional diagnostic sample. In the representation in FIG. 4, the diagnostic sample is provided by the DSP system 9, but it is also possible for the diagnostic sample to be a noise/sinusoidal signal sample generated by the FPGA system itself.

The stages 5321 and 5322 are summed in a summation stage 5323 and fed to the biquad calculation stage 5324. The output sample of the stage 5325 contains the output sample y, which is fed to the subsequent calculation stage 533 and can also be read by the DSP system 9 to a diagnostic stage 91. The DSP system 9 evaluates the diagnostic signal.

For diagnostic purposes, this enables specific signals to be fed in the summation stage 5322 by means of the DSP system 9 in order, within the FPGA system, to be fed, in stage 5323, together with the contents of stage 5321 to the calculation in stage 5324. The result is the signal Y in stage 5325, which is tapped off and fed to the DSP system. In this way, the transfer characteristic of the biquad filter can be measured by feeding in a noise signal at 5322 and checking the spectrum of the Y signal at 5325. The transfer function between the output stage 5325 and the input stage 5322 represents the transfer function of the biquad filter.

The transfer function of the vibration isolation system can be determined by means of the DSP system 9 as follows: A noise signal is written to the output buffer 55 [A]. A signal [B] is tapped off from the sensor control matrix 51. The transfer function of the connected vibration isolation system is characterized by [B] [A].

In addition, the DSP system has read and write access to the coefficients a1, a2, b0, b1 and b2 of each biquad filter. This enables the characteristics of the filter cascade to be changed by the DSP system 9.

Returning to FIG. 4, an output signal calculation block 55 is shown here, and is used to calculate actuator actuation signals. For this purpose, the axis output signals from the memory area 54, which constitute a vector with six values, are converted to a total of at least six individual actuator signals. A matrix of 8×6 is used here so that eight actuator actuation signals are produced.

Calculation of axis output signals for the actuator actuation signals (i=1 . . . 8).

Actuator actuation signal $$[i] = \sum_{k=1}^{6} \text{Matrix } [i][k] \cdot \text{Axis output signal } [k] \quad (5)$$

FIG. 6 shows a schematic structure of the actuator buffer 8 for an arrangement according to FIG. 2. There are eight branches 81 to 88, one branch for each actuator. Each branch has four lines, which are shown for branch 81 by 811, 812, 813 and 814. Line 811 contains the actuator actuation signal of the FPGA system while lines 812, 813 and 814 contain contributions to the DSP system(s). Branches 82 to 88 are similar to branch 81, but are each designed for a different actuator. A summer 815, 825 . . . 885 is connected downstream of each branch in order to sum the contributions from the different lines of the actuator buffer, and to arrive at the actual actuator actuation signal.

The novel control of an active vibration isolation system contains a controller, the heart of which is an FPGA system. This FPGA controller calculates axis signals in six degrees of freedom. The controller has the major advantage that it works purely digitally, but without the disadvantage of having to accept too large a phase loss in the control path. The advantages of good configuration capability and the possibility for control by means of a PC are retained.

The invention claimed is:

1. A control system for controlling an active vibration isolation system incorporating:
   i) a plurality of vibration signal transducers (2) for providing analog sensor signals,
   ii) a plurality of actuators (3) for suppressing vibration,
   iii) a control unit for processing the analog sensor signals to form digital actuator actuation signals,
   iv) an analog-digital converter (4) for converting the analog sensor signals to digital sensor signals, and
   v) a digital-analog converter (6) for converting the digital actuator actuation signals to analog actuator actuation signals,
   characterized by comprising:
   an FPGA system (5) as a control unit, which is made up of freely programmable gate arrays and comprises:
   a) a sensor control matrix (51), which calculates axis signals in required degrees of freedom, namely by means of the digital sensor signals depending on the spatial arrangement of the vibration signal transducers (2) and their directional sensitivity,
   b) a control cascade block (53) for the axis signals containing multiple biquad filters (531, 532, 533, 534, 535) in each row for one degree of freedom, which respectively constitutes a calculation rule with freely adjustable coefficients in order to provide axis output signals, and
   c) an output signal calculation block (55) for calculating digital actuator actuation signals, starting from the axis output signals.

2. The control system of claim 1, wherein a sensor buffer (7) for providing the digital sensor signals is arranged between the analog-digital converter (4) and the FPGA system (5), and an actuator buffer (8) for providing the digital actuator actuation signals is arranged between the FPGA system (5) and the digital-analog converter (6).

3. The control system of claim 2, wherein an input-side FPGA module (10) is inserted between the digital-analog converter (4) and the sensor buffer (7), and an output-side FPGA module is inserted between the digital-analog converter (6) and the actuator buffer (8).

4. The control system of claim 1, wherein the sensor control matrix (51) multiplies six sensor values by a 6×6 matrix.

5. The control system of claim 4, wherein the control cascade block (53) contains six independent control cascades each with five biquad filters (531 to 535) in each row.

6. The control system of claim 2, wherein a digital signal processor (9) is connected in parallel with the FPGA system (5) in order to calculate controls with low phase loss requirements and input them to the control system.

7. The control system of claim 1, wherein the or a further digital signal processor (9) is connected to at least one biquad filter (532) in order to set up or change coefficients of the biquad filter.

8. The control system of claim 1, wherein each biquad filter (531 to 535) has an output buffer (5325) to supply a downstream biquad filter or a digital diagnostic signal processor (9).

9. The control system of claim 6, wherein the digital signal processor (9) is connected to one or more stages of the control system in order to determine the transfer function of parts of the control or of the vibration isolation system.

10. The control system of claim 9, wherein more than six digital actuator actuation signals are provided in the actuator buffer (8).

* * * * *